May 22, 1923.

H. F. GEIST

MAGNETO

Filed Sept. 2, 1919

Inventor
Harry Forest Geist.
By Morsell + Keeney.
Attorneys

May 22, 1923.

H. F. GEIST

MAGNETO

Filed Sept. 2, 1919

INVENTOR.
Harry Forest Geist.
BY Morsell & Keeney.
ATTORNEY.

May 22, 1923.

H. F. GEIST

MAGNETO

Filed Sept. 2, 1919

Inventor
Harry Forest Geist.
By Morsell & Keeney.
Attorneys

Patented May 22, 1923.

1,456,001

UNITED STATES PATENT OFFICE.

HARRY FOREST GEIST, OF SUMTER, SOUTH CAROLINA.

MAGNETO.

Application filed September 2, 1919. Serial No. 321,065.

*To all whom it may concern:*

Be it known that I, HARRY FOREST GEIST, a citizen of the United States, and resident of Sumter, in the county of Sumter and State of South Carolina, have invented new and useful Improvements in Magnetos, of which the following is a description, reference being had to the accompanying drawings, which are a part of this specification.

The present invention relates to certain new and useful improvements in magnetos, more especially for ignition purposes.

One object of the invention is to produce a magneto of high electrical efficiency and of simple mechanical construction through the design of the magnetic circuit and its relation to the coils or windings of the machine. The electrical efficiency relates more to the efficiency of energy delivery and is attained in this machine by skeletonizing magnetic circuit parts in both the rotor and the stator, which magnetic skeletonization due to a decrease in the inductance of the windings and a consequent decrease in the time-constants of the circuits permits the energy to be delivered at a higher rate and thus at a higher intensity, other external conditions being the same, as hereinafter set forth.

Another object of the invention is to provide pole shoes having laminated sections as a part of the otherwise skeletonized pole shoe features to reduce the iron losses of the machine, tending thereby to increase the useful energy generated and stored as well as to facilitate the high rate of energy delivery.

A further object of this invention is to provide the pole pieces and magneto base in the cast in form of construction; the soft iron pole pieces being thus held in place by a non-magnetic material such as brass, so that the apertures incorporated for skeletonizing the pole pieces will be filled with the non-magnetic material, tending thereby to maintain the distributed capacity between the frame of the machine and the outside windings of the armature as high as possible, for the purpose of further decreasing the time-constant of the delivery circuit thus further increasing the rate of energy delivery, as hereinafter set forth. The cast in pole pieces are provided to support laminations to form combination pole pieces.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which.

Figure 1:
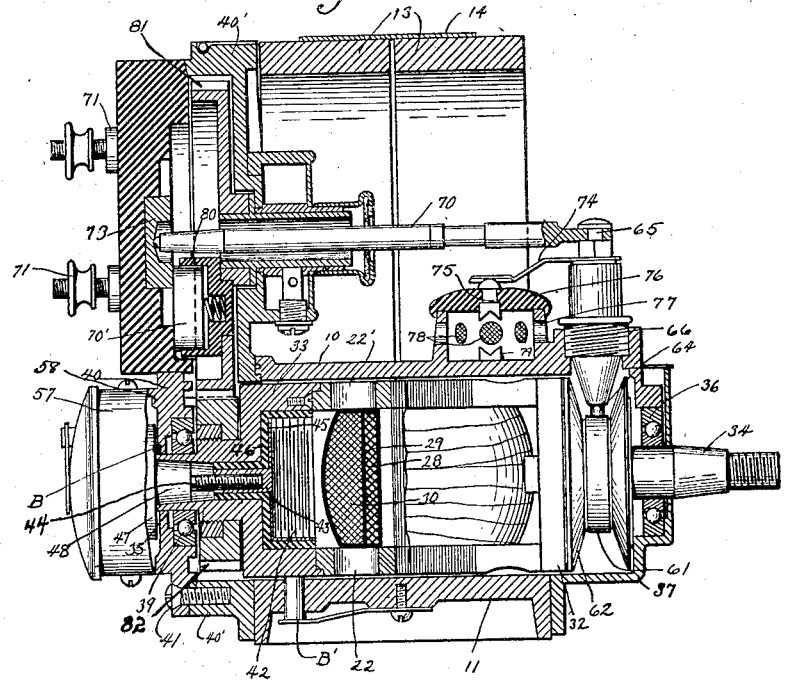
Fig. 1 is a side view of a complete magneto embodying my several improvements, parts being broken away and in section to more clearly illustrate the various details of construction.
Figure 2:
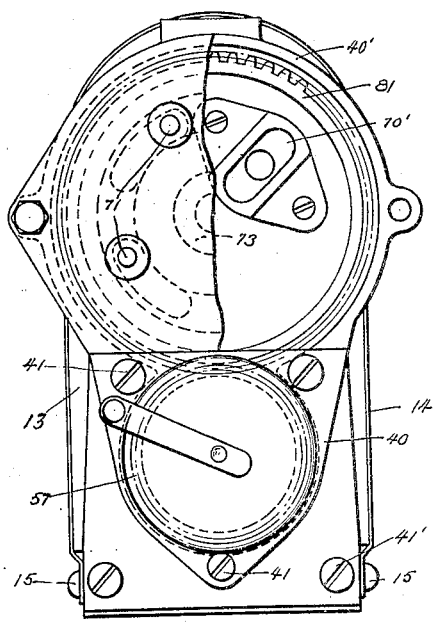
Fig. 2 is a view looking toward the distributer end of the magneto, a portion of the distributer block being broken away.

For convenience in explanation, the mechanical construction of the frame, field, armature and interrupter will be described first and the circuit connections of the machine together with its operation and functions will be thereafter described.

The frame consists of a centrally-bored rectangular casting or block 10 having a base portion 11 adapted to be mounted on any suitable support adjacent the engine to which the magneto is operatively connected.

The field consists of pole shoes designed as a whole as at 12, which are of magnetic material cast integral with the block 10 which is of non-magnetic material, such as brass. The permanent magnets 13 are of U shape and span the block so as to contact with the outside walls of the pole shoes and are held in place by a non-magnetic strip 14 surrounding said magnets and connected at the lower ends to the frame 10 by any suitable means, such as screws, 15.

The pole shoes are of special construction, designed to reduce the iron losses due to eddy currents and hysteresis as much as possible and to reduce the time-constant of the secondary winding on the armature by means of apertures or hollow portions without interfering with the length of the magnetic cutting edges represented by the pole piece tip edges which co-act with the armature face tip edges to effectively shift the flux for energy generation. The pole shoes each consist of a plurality of soft iron laminæ 16 secured to a soft iron block 17 by means of securing screws 18 or other suitable means, both the laminæ and the block contacting with the magnets and having their inner sides curved to form a polar embrace for the armature as best shown in Figure 3.

Figure 3:
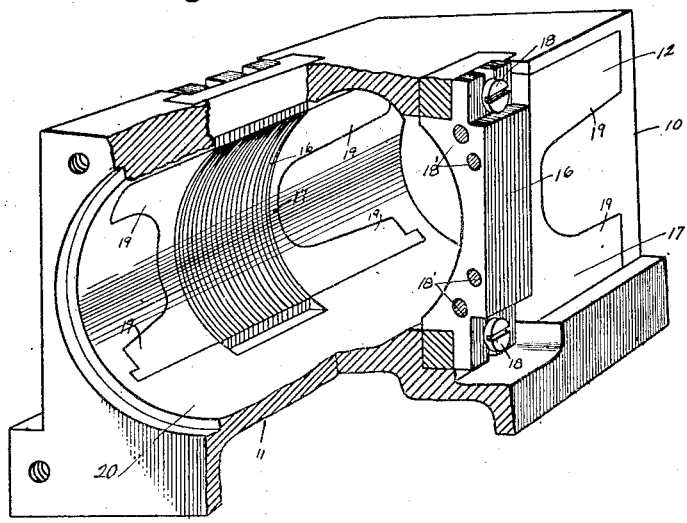
Fig. 3 is a perspective view of the novel form of combined base and pole pieces I employ, parts being broken away and in section to illustrate the various structural details.

The laminæ of each pole shoe are held together by means of rivets 18' passing therethrough, and the soft iron blocks 17 are of the I shape depicted in Fig. 3, provided with spaced apart upper and lower lugs or projections 19 and cast in the block 10 when the same is poured so that the non-magnetic material fills the spaces between the projections 19. The iron block 17 has its inner and outer surfaces conforming with the inner and outer surfaces of the block 10, as best shown by Figure 3. It is not essential that the extreme outside surfaces of the pole piece blocks 17 which contact with the magnets maintain the special I form that is presented for co-action with the armature at the inner surfaces, but it is essential to the principles involved that the magnetic hollow places between the lugs 19 be maintained at the inner surfaces and for a liberal depth back toward the surfaces contacting with the magnets.

The laminæ 16, used in the pole pieces, serve to break up the eddy currents which travel through the field at right angles to the plane of said laminæ and to reduce the hysteresis due to higher grade magnetic material obtainable in that form, and thus reduce the iron losses coincident to the performance of the machine for both energy generation and delivery. The soft iron blocks 17 are provided in special shape relieved between the lugs 19 so that as much iron as is unnecessary for energy generation and storage is removed from proximity to the secondary or outside windings of the armature with a resultant decrease in the dampening effect of such iron on said winding which results in a decreased inductance and decreased time-constant of the secondary circuit, providing at the same time the magnetic lugs or projections 19 to give the pole pieces as a whole long magnetic cutting tips for co-action with the armature face tips. The non-magnetic material of the frame 10 filling as it does the spaces between the lugs 19 assures that the distributed capacity between the frame 10 as a whole and the secondary winding will be maintained as high as possible within the limits that the frame influences it. As before stated, for convenience in manufacture the block or rim 10 is cast around the blocks 17 by any desired method so that the whole forms one unitary structure having a bore 20 therein for receiving and centering the armature and its bearings.

The armature consists of an I-shaped core formed by I-shaped soft iron laminæ 21 and 21' clamped between solid iron I-shaped members 22, all being secured together by rivets 23, and further consists of armature windings hereinafter described. The laminæ are provided in the core to reduce the iron losses by breaking up the eddy currents and reducing the hysteresis coincident to the operation of the machine. The core parts 22 are provided with apertures 22' in their faces to relieve as much unnecessary iron from the proximity of the secondary winding as possible so as to reduce the time-constant of the secondary circuit without affecting the length of the armature face edges which co-act with the pole piece tips for effectively shifting the flux during energy generation. In this core the middle group of laminæ 21' are formed with the web joining the end portions narrower than the web joining the face portions in the laminæ 21 and the web of the solid portions 22, so that a cross section of the web of the core as a whole is also of an I form. The reliefs due to the narrow web laminæ 21' and their relation to 21 and 22 are to attain a relation between the core and the primary winding hereinafter described. The assembled core as a whole is so proportioned that its faces are sufficiently wide to bridge the gap between the pole pieces of the frame when the armature is in a vertical position and in addition provide a sufficient overlap area between the pole piece tips and the armature face tips that an iron path will always join the opposite pole pieces through an air space that never exceeds twice the clearance between the rotor and stator.

The armature windings comprise a primary coil 28 which is insulated from the core by insulation 29 and a secondary coil 30 insulated from the primary and the core, both coils being wound around the web portion of the core, the primary winding being grounded to the core by having one end connected to a grounding screw, not shown, as is usual in devices of this kind. In this machine the secondary coil is also grounded to the armature core in the same manner as the primary ground.

The purpose of having the core web relieved due to the difference in width of the web of laminæ 21 and 21' is to have the primary turns spaced from the core laminæ 21' which represent the main core magnetic path, so as to reduce the coefficient of self-induction per turn of the primary winding by reducing the amount of the little local reactive flux loops that are present in the primary turns in close proximity to the iron. The tendency also is that the inductance per turn of the primary will be more uniform for the various turns and layers of that coil. During the period of sparking in a high tension magneto, high frequency energy oscillations take place between the primary winding and the condenser which influence in a measure the snap and vim of the high tension spark delivered by the secondary circuit. The functions of the primary and its condenser are improved by the elimination of the small local paths and their dampening effects upon the high frequency oscillations.

It will be noted in the present construction that a skeletonization of the field poles is employed to quicken the energy delivery performance of the machine; that a skeletonization of the armature core is also employed through apertures and reliefs for further quickening the performance of the machine in its energy delivery, and that laminæ are used in both the field poles and the armature for the reduction of the iron losses coincident to energy generation and delivery, and the relation between the armature and poles in their several parts are such that the laminæ of the pole pieces register with the laminæ of the armature and that the solid iron parts of the pole shoes register with the solid parts of the armature core, the arrangement as a whole producing as short a magnetic circuit as possible for most of the flux which will tend to localize itself as much as possible to the laminated portions.

The armature is provided with brass or other nonmagnetic end plates 32 and 33 suitably secured thereto, the plate 32 having the armature shaft 34 fixedly mounted therein and the plate 33 having a metal bushing 35 fixedly mounted therein. The shaft 34 is journaled in a ball bearing journal 36 mounted on a frame end plate 37 centered and secured to the frame or block 10 and through which the shaft extends, the shaft being connected up to any suitable source of power for rotating it, as by a gear connection with the engine. The bushing 35 is journaled in a ball bearing journal 39 mounted on a frame end plate 40 centered and secured to the gear housing 40' by screws 41, which in turn is centered and secured to the frame 10 by screws 41', the end plate 37 being secured in a similar manner. On the removal of either of the end plates 37 and 40, the whole armature may be withdrawn from the frame.

The primary circuit is also provided with a condenser 42 mounted in the armature on the plate 33 by means of a grounding screw and a threaded plate 43 and bolt 44 which also serves to secure the breaker or interrupter in position as hereinafter described, one terminal of the condenser being insulated from the conductor parts by means of a plate 45 and a bushing 46 of insulating material.

The breaker or interrupter consists of a metal disk 47 having a tapered projection 48 seated and keyed in a tapered seat formed in the bushing 35 and having mounted thereon but insulated therefrom a contact carrying member 50, the bolt 44 passing through apertures in the member 50 and the disk to removably clamp the breaker as a whole to the armature and to electrically connect member 50 with the condenser 42, the bolt being insulated from the disk 47. A contact lever 51 is pivotally mounted on the disk 47 by means of a stud member 52 from which the same is insulated, and is provided with a contact point 53 adapted to engage with an adjustable contact 54 mounted on the member 50. The contacts 53 and 54 are normally urged to engagement by means of a spring 55 secured to the lever 51 and to the disk 47, and the circuit is interrupted by breaking the contact by means of cams 56 carried on an adjustable sleeve 57 mounted on a cylindrical boss 58 of the end plate 40 and provided with a suitable time adjusting lever (not shown). The cams 56 are adapted to contact with a fiber cam block 60 on the lever 51 during the rotation of said lever with the armature. a part of the lever 51 carrying the block 60 moving inwardly while in contact with the cam 56 and the other end of the lever carrying the contact 53 moving outwardly to break the circuit. The breaker lever 51 short circuits the primary coil and condenser through spring 55 and tapered connection between breaker plate 48 of 47 and bushing 35.

Means are also provided for collecting the secondary current from the armature consisting of a collector ring 61 mounted in an annular groove of a disk 62 of insulating material which is mounted on the armature shaft 34, the ring being connected to the secondary coil by an insulated conductor wire 63, passing through an insulating boss on spool 62 through end plate 32. A contact finger 64 yieldingly slidably mounted in a binding post 65 contacts with the ring 61, the post 65 and finger 64 being insulated from the frame by a socket member 66 of insulating material. The contact finger is adapted to be connected with the ungrounded terminal of the spark plugs 67 through the distributor mechanism to be later described.

A circuit wire 68 connects the primary coil with one side of the condenser and thence to the insulated interrupter point through bolt 44, and a screw 69 grounds the other side of the condenser to the armature core, while the interrupter spring 55 grounds the interrupter and short circuits the primary winding and the condenser when the points 53 and 54 are in contact. A discharge brush B' grounds the armature to the frame and prevents the secondary current from passing through the oil in the ball bearings.

Figure 4:
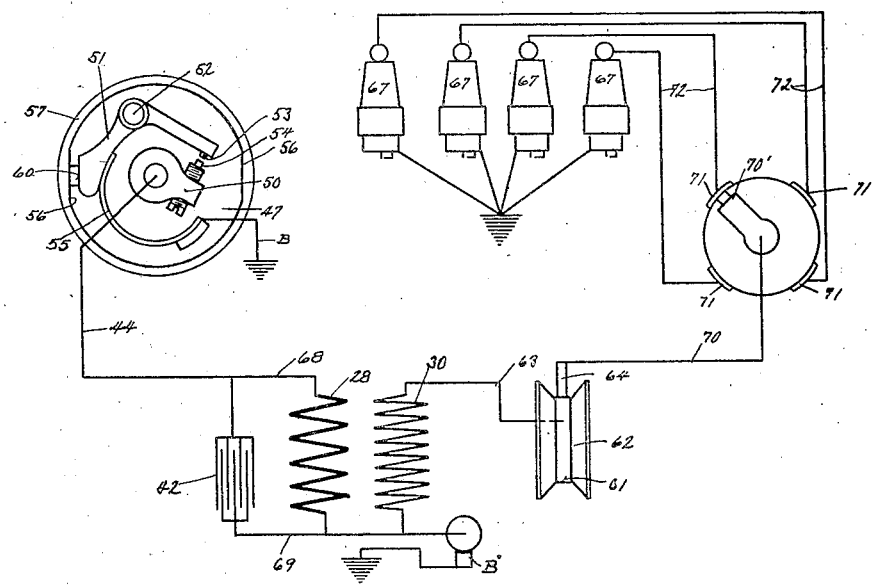
Fig. 4 is a diagrammatical view of a complete high tension magneto circuit.
Figure 5:
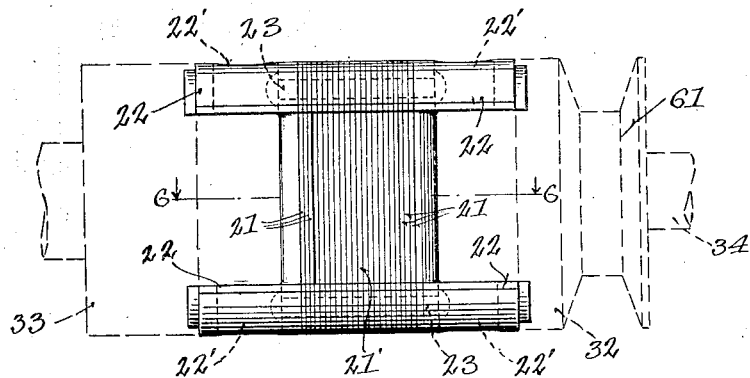
Fig. 5 is a side plan view of the armature core, the end plates being shown in dotted lines.
Figure 6:
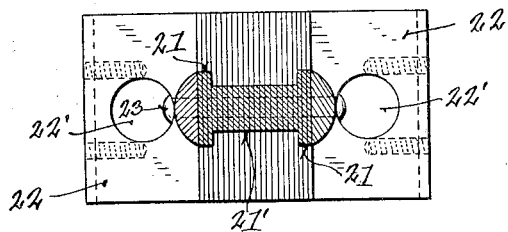
Fig. 6 is a sectional view taken therethrough on the line 6—6 of Figure 5.
Figure 7:
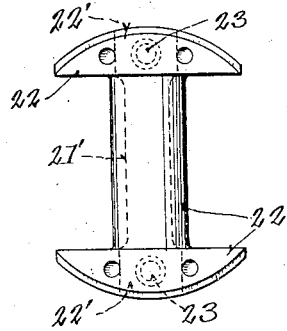
Fig. 7 is an end plan view of the armature core.

In Figure 4 I have shown diagrammatically the circuit connections between the primary and secondary coils, the condenser, interrupter, distributor, spark plugs and the ground. It will be noted that the primary winding is connected in series with the interrupter and is grounded on the core. The condenser is shunted across the primary winding and the breaker, one side being connected to the primary circuit by the wire 68 and the other side being grounded on the core by the screw 69. One side of the secondary coil is connected to the ungrounded electrodes of the spark plugs 67 through the wire 63, ring 61, finger 64, post 65, extensible pencil 70, distributor brush or finger 70', the distributor contact 71 which is in register with the finger 70' and the wire 72 leading from the contact 71 registering with the finger 70' to the aforementioned electrode of the spark plug.

As best shown in Fig. 1, an extensible pencil 70 leads from the post 65 and is resiliently urged to connect with a central plate 73 of the distributor with which the brush 70' is in contact constantly, whereby the same when engaged with one of the contacts 71 will bridge the space and complete the circuit, before described. The distributor brush 70' is mounted by spring means in an insulated member 80 which in turn is mounted on the gear 81, said gear being journaled in the gear housing 40', which gear meshes with a gear 82 mounted on the bushing shaft 35 of the armature, so that the brush 70' is rotated to the contacts 71 in timed relation to the engine, through the timed relation between the armature and the engine, supplying the spark current to the spark plugs 67 in their order, as in the usual manner found in magneto distributors.

Also leading from the post 65 is a spring lead 74 which is connected with an electrode 75 carried by a cover member 76 of insulated material which encloses the top of a spark cup or enclosure 77 having a plurality of gauze covered vent openings 78 therein and an electrode 79 grounded with the block 10.

The safety gap functions as is usual in devices of this character in that, when the circuit of either of the spark plugs 67 is abnormally open circuited, the electrical spark will jump the gap between electrodes 75 and 79 and thus prevent the possibility of the current breaking down the insulation of the condenser or the secondary coil.

The distributor brush 70' is mounted by spring means in an insulated member 80, which in turn is mounted on a gear 81 which meshes with a gear 82 mounted on the armature shaft bushing 35, so that the brush 70' is rotated to the contacts 71 in timed relation to the engine. The timed relation between the gear connection of shaft 34 to the engine supplys the spark current to the spark plugs 67 in their order, as in the usual construction and functioning of distributors or magnetos.

All of the functions performed by the magneto necessary to the delivery of the spark are influenced by the skeletonization of the field pole shoes and armature core. Energy generation and storage is improved by the use of the field pole laminæ and the maintenance of the full length of field pole piece upper and lower tip edges.

The method of relieving all iron, unnecessary to energy generation and storage, from the presence of the windings quickens the energy transformation and delivery to the spark by reducing the lag or electro-magnetic retarding effect that such iron exerts in the usual construction and thus improves the sparking efficiency of the machine.

While the above functions are performed by the self-contained high tension magneto as illustrated in the drawings and described herein, it will be understood that the same skeletonized magnetic circuit features and co-related laminated features are of value for the quickening of the electrical action in electrical generators as a whole. As for example in a low tension magneto where the armature is actuated by springs and certain periods are allowed for energy generation, storage and delivery, or for dual ignition systems where certain inherent electrical characteristics must exist in the magneto for efficient electrical co-operation with step up coils external to the magneto, the above described principles are of value and are intended to come within the scope of this invention as described in the following appended claims.

What I claim as my invention is:

1. In a wound armature type magneto, the combination of a revoluble armature carrying windings, a field structure comprising a frame, field magnets and pole shoes, said pole shoes being composed of magnetic material and substantially I shape to reduce the central polar magnetic areas without reducing the length of the polar tip edges.

2. In a wound armature type magneto, the combination of a revoluble armature carrying primary and secondary windings, a field structure comprising a frame, field magnets and pole shoes, said pole shoes being composed of magnetic material substantially I shape, the hollow portions between the upper and lower projections on each side of the pole shoes being filled with non-magnetic metallic material whereby to maintain the distributed capacity of the secondary winding as high as possible to decrease the time-constant of the secondary circuit, substantially as described.

3. In a wound armature type magneto, the combination of a revoluble armature carrying primary and secondary windings, a field structure comprising a frame, field magnets and pole shoes, said pole shoes being composed of magnetic material with central polar area reliefs, said reliefs being filled with non-magnetic metallic material for the purpose described.

4. In a wound armature type magneto, the combination of a revoluble armature carrying windings, a field structure comprising a frame, field magnets and pole shoes, said pole shoes being of magnetic material and substantially I shape, comprising a vertical portion built up of laminæ between solid iron parts having projections at the upper and lower polar extremities to increase the magnetic depth of the pole shoes at the upper and lower tips over the depth of the laminated portion.

5. In a wound armature type magneto, the combination of a revoluble armature carrying windings, a field structure comprising a frame, field magnets and pole shoes, said pole shoes comprising iron blocks of substantially I shape, the vertical parts of which are recessed to receive and support laminated portions, said laminated portions forming paths for magnetism changing from upper to lower polar tips or vice versa during the rotation of the armature.

6. In a wound-armature type magneto, the combination of a field structure comprising field magnets and pole shoes, said shoes being composed of central laminated portions and end portions provided with laterally extended polar tips; and an armature comprising a core carrying primary and secondary windings, said core comprising a laminated web portion of a width substantially equal to that of the laminated portions of said field pole shoes, and extended pole faces of a length substantially equal to that of said polar tips.

7. In a wound armature type magneto, the combination of a revoluble armature carrying windings, a field structure comprising a frame, field magnets and pole shoes, said pole shoes having laterally extending polar tips presenting a substantially greater magnetic depth parallel with the axis of rotation than is presented by the pole shoes, and central portions composed principally of laminated iron disposed at right angles to the axis of rotation of the armature, so that during magnetic coaction between the armature and field poles, the flux is localized to the laminated portions substantially as described 8. In a wound armature magneto, the combination of a field structure, comprising a frame, field magnets and pole shoes and an armature comprising a core carrying primary and secondary windings, said core including a plurality of I shaped laminæ clamped between I shaped solid iron parts, the web laminæ being narrower than the web solid parts so that the primary coil turns will be magnetically spaced from the core web laminæ to reduce the dampening effect of said web on said primary substantially as described.

9. In a wound armature type magneto, the combination of a field structure, comprising a frame, field magnets and pole shoes and an armature comprising a core carrying primary and secondary windings said core being substantially I shaped and composed of magnetic material, the web of said core being so relieved on the sides parallel to the axis of rotation as to be substantially I shaped in cross section parallel to the axis of rotation for the purposes described.

In testimony whereof, I affix my signature.

HARRY FOREST GEIST.